(12) United States Patent
Upton et al.

(10) Patent No.: US 11,395,389 B2
(45) Date of Patent: Jul. 19, 2022

(54) METHOD AND APPARATUS FOR FLASHING ZERO HARMONIC POWER SUPPLY

(71) Applicant: B/E AEROSPACE, INC., Winston Salem, NC (US)

(72) Inventors: Brendan M. Upton, East Patchogue, NY (US); Denis A. Velis, Oakdale, NY (US)

(73) Assignee: B/E Aerospace, Inc., Winston Salem, NC (US)

( * ) Notice: Subject to any disclaimer, the term of this patent is extended or adjusted under 35 U.S.C. 154(b) by 46 days.

(21) Appl. No.: 17/118,181

(22) Filed: Dec. 10, 2020

(65) Prior Publication Data
US 2021/0185781 A1    Jun. 17, 2021

Related U.S. Application Data

(60) Provisional application No. 62/948,065, filed on Dec. 13, 2019.

(51) Int. Cl.
*H05B 45/36* (2020.01)
*H05B 45/10* (2020.01)
*B64D 47/06* (2006.01)

(52) U.S. Cl.
CPC ............ *H05B 45/36* (2020.01); *B64D 47/06* (2013.01); *H05B 45/10* (2020.01); *B64D 2203/00* (2013.01)

(58) Field of Classification Search
CPC ........ H05B 45/48; H05B 45/36; H05B 45/44; H05B 45/46; H05B 45/50; H05B 45/20; H05B 45/56; H05B 45/10; H05B 45/3725; H05B 45/375; H05B 45/24; H05B 45/355; H05B 45/38; H05B 45/395; H05B 47/10; H05B 45/14; H05B 47/105; H05B 47/19; H05B 45/18; H05B 45/22; H05B 45/325; H05B 45/382; H05B 45/385; H05B 45/39; H05B 45/59; H05B 45/60; H05B 47/11; H05B 47/115; H05B 47/12; H05B 47/16; H05B 47/24; H05B 47/25; H05B 47/26; Y02B 20/30; Y02B 70/10; Y02B 20/40; F21Y 2115/10; F21Y 2103/10; F21Y 2105/00; F21Y 2113/13; F21Y 2115/15; F21K 9/278; F21K 9/27
See application file for complete search history.

(56) References Cited

U.S. PATENT DOCUMENTS

| | | | |
|---|---|---|---|
| 8,575,862 | B2 | 11/2013 | Dubrovsky |
| 8,810,141 | B2 | 8/2014 | Takeda et al. |
| 9,800,049 | B1 | 10/2017 | Sam et al. |
| 10,099,787 | B2 * | 10/2018 | Upton ................ H05B 45/24 |

(Continued)

OTHER PUBLICATIONS

European Patent Office, European Search Report dated May 14, 2021 in Application No. 20213942.4.

*Primary Examiner* — Monica C King
(74) *Attorney, Agent, or Firm* — Snell & Wilmer L.L.P.

(57) ABSTRACT

A harmonically corrected driver board architecture of electronically communicating circuits may comprise a driver board regulation circuit, a harmonic correction and light emitting diode (HCLED) driver circuit, a LED driver ballast circuit, and a flash interface circuit, wherein the flash interface circuit is configured to generate an op-amp shutdown signal to the HCLED driver circuit.

20 Claims, 16 Drawing Sheets

(56) References Cited

U.S. PATENT DOCUMENTS

| | | | |
|---|---|---|---|
| 10,128,654 B2* | 11/2018 | Johannessen | H05B 45/395 |
| 2004/0245946 A1 | 12/2004 | Halter | |
| 2012/0169417 A1 | 7/2012 | Sakai | |
| 2018/0198279 A1* | 7/2018 | Johannessen | H05B 45/48 |
| 2019/0297695 A1 | 9/2019 | Shi et al. | |
| 2021/0185781 A1* | 6/2021 | Upton | H05B 45/10 |

* cited by examiner

METHOD AND APPARATUS FOR FLASHING ZERO HARMONIC POWER SUPPLY

CROSS REFERENCE TO RELATED APPLICATIONS

This application claims priority to and benefit of Provisional Patent Application No. 62/948,065 titled, "METHOD AND APPARATUS FOR FLASHING ZERO HARMONIC POWER SUPPLY" filed, Dec. 13, 2019. All of the contents of the previously identified application are hereby incorporated by reference for any purpose in their entirety.

FIELD

The present disclosure relates generally to correction of electrical signals for characteristics such as harmonics and power factor.

BACKGROUND

There are many scenarios in which power harmonics may have a significant impact on an electrical system. Once such scenario is on aircraft electrical systems. In an aircraft, and in particular a passenger aircraft, unwanted harmonics in one system may tend to negatively impact the operation of other systems. For example, the unwanted harmonics may tend to generate electromagnetic fields which may be adverse to the nominal operation of aircraft systems. The problem of unwanted harmonics and electromagnetic fields may tend to be compounded in flash lamp applications such as, for example, aircraft collision warning lights.

SUMMARY

In various embodiments, a harmonically corrected driver board architecture of electronically communicating circuits comprises a driver board regulation circuit, a harmonic correction and light emitting diode (HCLED) driver circuit, a LED driver ballast circuit, and a flash interface circuit, wherein the flash interface circuit is configured to generate an op-amp shutdown signal to the HCLED driver circuit.

In various embodiments, the driver board regulation circuit is configured to generate a regulated 15V DC power in response to receiving a 115V AC power. In various embodiments, the flash interface circuit generates the op-amp shutdown signal and a LED ballast enable signal in response to receiving a flash signal. In various embodiments, the HCLED driver circuit further comprises a network including a harmonic correction circuit, an LED driver circuit, a harmonic ballast circuit, a peak limiter circuit, and a cross-conduction prevention circuit. In various embodiments, the harmonic correction circuit comprises an op-amp having a non-inverting input connect to a rectified input voltage and the inverting input connected to a current sense resistor, wherein the rectified input voltage is scaled down through a first resistor divider to generate a current reference waveform. In various embodiments, the op-amp, while active, is configured to make a feedback voltage from the current sense resistor equal to the current reference waveform. In various embodiments, the peak limiter circuit is configured to clip the peak of a voltage reference waveform in response to the voltage reference waveform exceeding a maximum normal operating range. In various embodiments, the harmonic ballast circuit includes a harmonic ballast transistor having its gate connected to the op-amp through a second resistor divider, wherein the op-amp and the harmonic ballast transistor are configured to keep the sense resistor current proportional to the current reference waveform. In various embodiments, the LED driver circuit includes an LED driver transistor having a gate connected to the output of the op-amp such that the LED driver transistor is fully on when current is flowing through the harmonic ballast transistor.

In various embodiments, an aircraft anti-collision lighting architecture of electronically communicating components comprises, a controller board, a LED board, and a driver board, wherein the controller board is configured to protect, filter, and rectify a primary power to generate a driver board power, wherein the controller board generates a flash signal, wherein the driver board comprises a driver board regulation circuit, a harmonic correction and light emitting diode (HCLED) driver circuit, a LED driver ballast circuit, and a flash interface circuit, wherein the flash interface circuit is configured to generate an op-amp shutdown signal to the HCLED driver circuit in response to receiving the flash signal.

In various embodiments, the driver board regulation circuit is configured to generate a regulated 15V DC power in response to receiving the driver board power. In various embodiments, the flash interface circuit generates a LED ballast enable signal in response to receiving a flash signal. In various embodiments, the HCLED driver circuit further comprises a network including a harmonic correction circuit, an LED driver circuit, a harmonic ballast circuit, a peak limiter circuit, and a cross-conduction prevention circuit. In various embodiments, the harmonic correction circuit comprises an op-amp having a non-inverting input connect to a rectified input voltage and the inverting input connected to a current sense resistor, wherein the rectified input voltage is scaled down through a first resistor divider to generate a current reference waveform. In various embodiments, the op-amp, while active, is configured to make a feedback voltage from the current sense resistor equal to the current reference waveform. In various embodiments, the peak limiter circuit is configured to clip the peak of a voltage reference waveform in response to the voltage reference waveform exceeding a maximum normal operating range. In various embodiments, the harmonic ballast circuit includes a harmonic ballast transistor having its gate connected to the op-amp through a second resistor divider, wherein the op-amp and the harmonic ballast transistor are configured to keep the sense resistor current proportional to the current reference waveform. In various embodiments, the LED driver circuit includes an LED driver transistor having a gate connected to the output of the op-amp such that the LED driver transistor is fully on when current is flowing through the harmonic ballast transistor.

In various embodiments, a method of reducing power harmonics in a light emitting diode (LED) flash lamp unit comprises receiving a flash signal, generating an op amp shutdown signal in response to the flash signal, pulling a drain pin of a field effect transistor to ground and, in response, enabling an op-amp, generating a LED ballast enable signal in response to the flash signal, and correcting a feedback voltage of a current sense resistor to equal a current reference waveform in response to enabling the op-amp, wherein the current reference waveform is proportional to a voltage waveform. In various embodiments, the method may comprise increasing an output voltage of the op-amp while the output voltage is below a forward voltage of an LED string and decreasing an output voltage of the op-amp in response to current flowing through an LED driver transistor.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

DETAILED DESCRIPTION

All ranges and ratio limits disclosed herein may be combined. It is to be understood that unless specifically stated otherwise, references to "a," "an," and/or "the" may include one or more than one and that reference to an item in the singular may also include the item in the plural.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

The present disclosure is generally directed to a method and apparatus for correcting power harmonics of a flash lamp circuit. In various embodiments, the method and apparatus are implemented as a discrete hardware device (e.g., a replaceable module, a system in package (SiP) or an application specific integrated circuit (ASIC)), which may itself be incorporated into other devices (such as, for example, a light emitting diode flash lamp unit comprising a string of LEDs).

Figure 1:
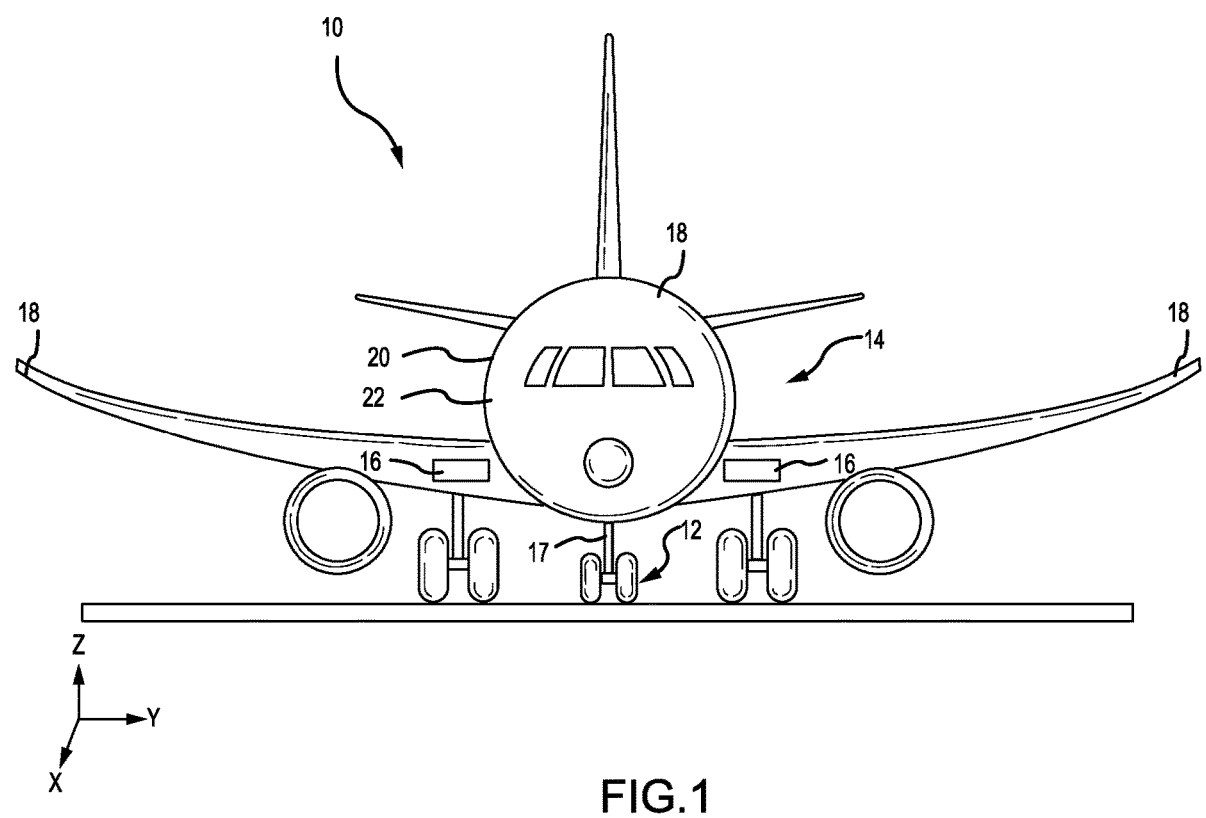
FIG. 1 illustrates an aircraft, in accordance with various embodiments.

In various embodiments and with reference to FIG. 1, an aircraft 10 in accordance with various embodiments may comprise aircraft systems, for example, one or more landing gear landing gear such as landing gear 12, which may generally support aircraft 10 when aircraft is not flying, allowing aircraft 10 to taxi, take off, and land without damage. Aircraft 10 may include one or more exterior lamps 14 such as, for example, landing lights 16, taxi lights 17, and navigation and warning lights 18 such as, for example, an anti-collision light which may periodically flash or strobe. In various embodiments, aircraft 10 comprise a primary power system 22 in communication with the exterior lamps 14 and/or cockpit controls 20 configured to deliver 115V AC power at 5 A and 400 Hz.

Figure 2:
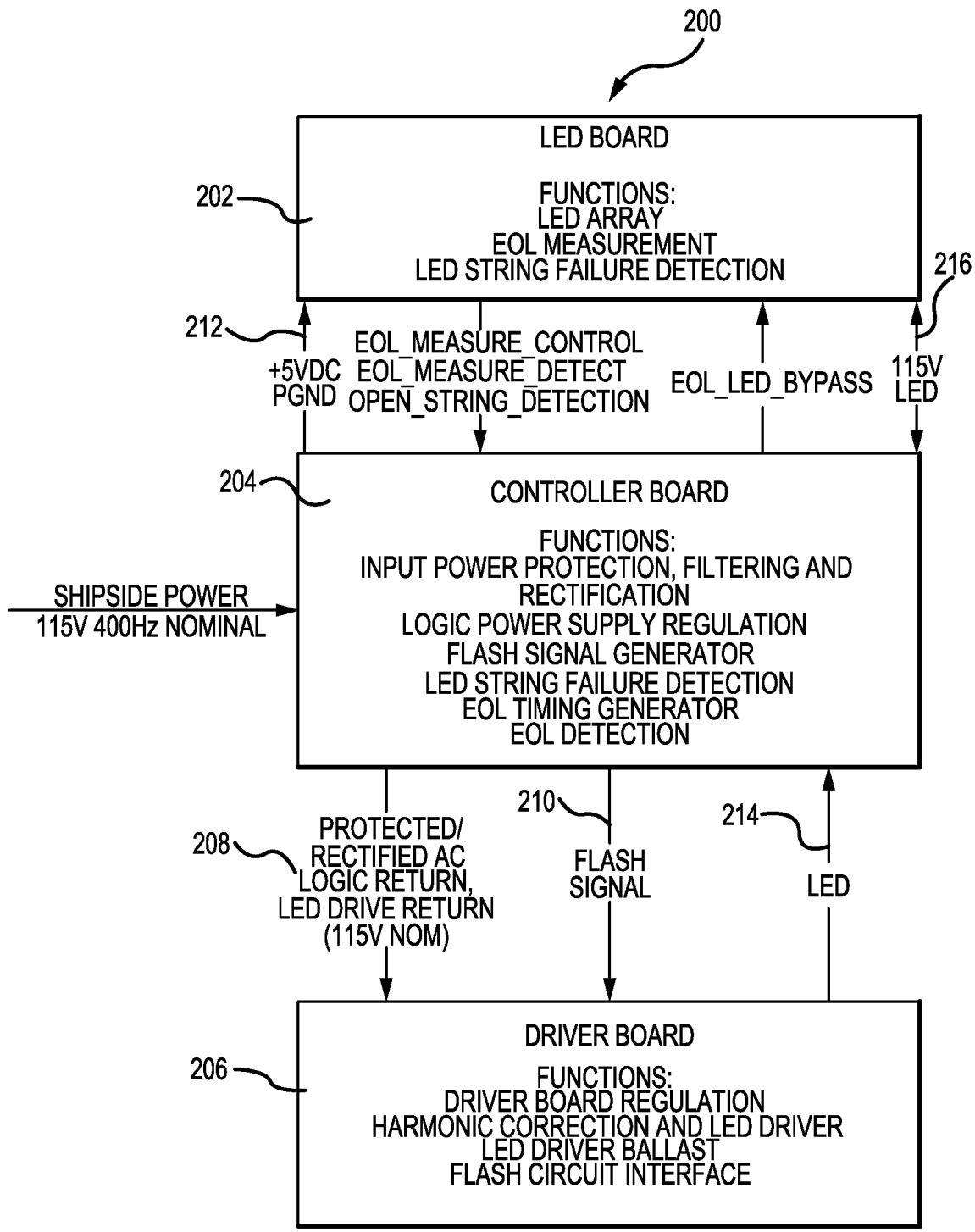
FIG. 2 illustrates a schematic diagram of an architecture for an anti-collision light, in accordance with various embodiments.

With additional reference to FIG. 2, a schematic diagram of an architecture 200 for an anti-collision light (e.g., a navigation and warning lights 18) is illustrated in accordance with various embodiments. The architecture 200 includes a LED board 202, a controller board 204, and a driver board regulation circuit 206. The controller board 204 is in electronic communication with the LED board 202, the driver board regulation circuit 206, and the primary power system 22. In various embodiments, the controller board 204 may be configured to receive electrical power from the primary power system and distribute driver board power 208 to the driver board regulation circuit 206. In various embodiments, the controller board 204 may protect, filter, and/or rectify the primary power to generate the driver board power 208. Controller board 204 may generate a flash signal 210 and transmit the flash signal 210 to the driver board regulation circuit 206. In various embodiments, the controller board 204 may be configured to supply a power ground 212 to the LED board 202 and may be configured to condition and/or regulate power for a logic power supply. The driver board regulation circuit 206 may generate an LED drive signal 214 in response to receiving the flash signal 210. In various embodiments, the controller board 204 may receive the LED drive signal 214 and in response distribute LED power 216 to the LED board 202.

Figure 3:
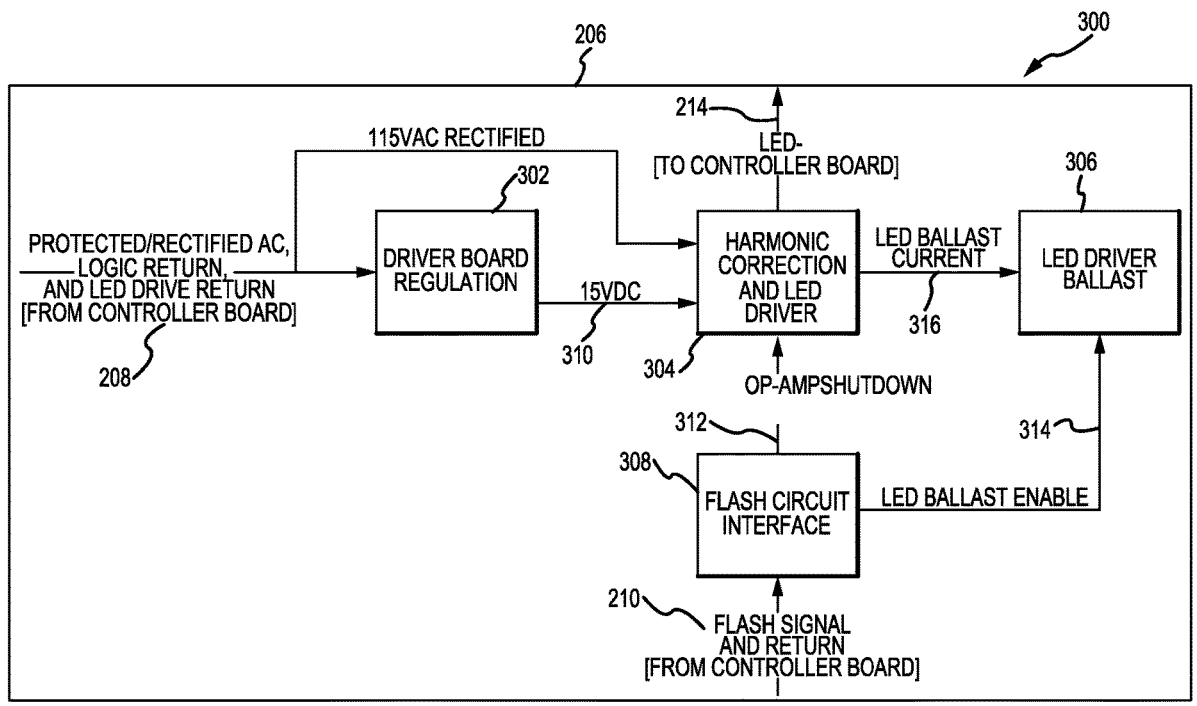
FIG. 3 illustrates a schematic diagram of an architecture for a driver board, in accordance with various embodiments.

With additional reference to FIG. 3, a schematic diagram of an architecture 300 for driver board regulation circuit 206 is illustrated in accordance with various embodiments. Architecture 300 includes a driver board regulation circuit 302, a harmonic correction and LED driver circuit (HCLED driver circuit) 304, a LED driver ballast circuit 306, and a flash interface circuit 308. The driver board regulation circuit 302 receives 115V rectified AC power (driver board power 208) from the controller board 204 input power filtering and rectification circuit. In response, the driver board regulation circuit 302 generates a regulated 15V DC power 310 for the HCLED driver circuit 304. The flash interface circuit 308 receives the flash signal 210 from the controller board 204 and, in response, generates an op-amp shutdown signal 312. In various embodiments, the flash interface circuit 308 generates a ballast enable signal 314 in response to the flash signal 210. The HCLED driver circuit 304 receives the driver board power 208 and the regulated 15V DC power 310. In response to switching of the op-amp shutdown signal 312, the HCLED driver circuit 304 generates the LED drive signal 214 and a ballast current 316. The HCLED driver circuit 304 dumps the ballast current 316 to the LED driver ballast circuit 306. In various embodiments, the LED driver ballast circuit 306 is configured to receive the ballast current 316 in response to receiving the ballast enable signal 314. In various embodiments HCLED driver circuit 304 is in electronic communication with an LED string.

Figure 4:
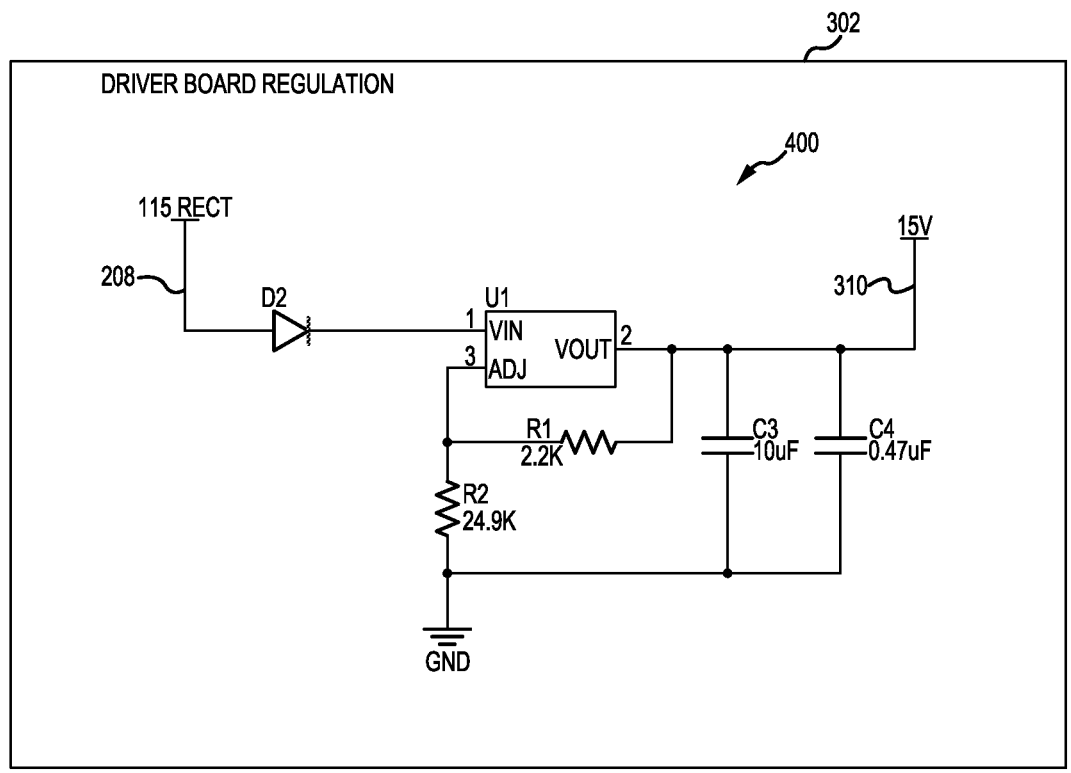
FIG. 4 illustrates a network of a driver board regulation circuit, in accordance with various embodiments.

With additional reference to FIG. 4, network 400 of driver board regulation circuit 302 is illustrated in accordance with various embodiments. U1 may be a microchip LR8 linear regulator with a max input voltage of 480V and a maximum output current of 20 mA. R1 and R2 may be adjustment resistors selected to produce a 15V DC output which is supplied to the HCLED driver circuit 304.

Figure 5:
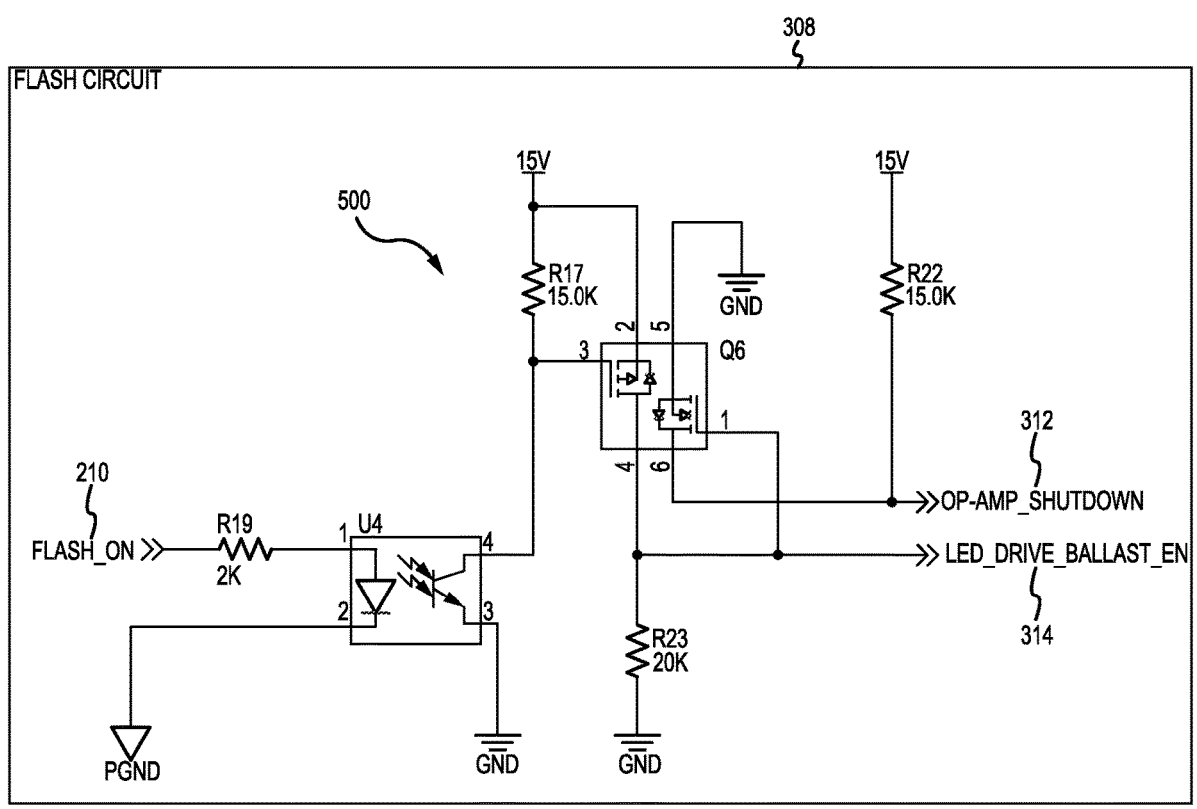
FIG. 5 illustrates a network of a flash interface circuit, in accordance with various embodiments.

With additional reference to FIG. 5, network 500 of flash interface circuit 308 is illustrated in accordance with various embodiments. As discussed above, the flash interface circuit 308 receives the flash signal 210 from the controller board 204 and converts it into the voltage and logic levels compatible with the HCLED driver circuit 304 functions. When a 5V flash signal is applied to the FLASH_ON pin of U4, the transistor output pulls R17 and the gate of the PFET of Q6 to ground. In response, the PFET of Q6 is turned on. The source pin of the PFET is connected to the LED_DRIVE_BALLAST_EN signal and the gate of the Q6 NFET. In this regard, the NFET is turned on in response to the ballast enable signal 314. When the Q6 NFET is turned on, its drain pin (connected to the OP-AMP_SHUTDOWN signal) is pulled to ground, thereby enabling the harmonic correction op-amp (U5, shown in FIG. 6B).

Figure 6A:
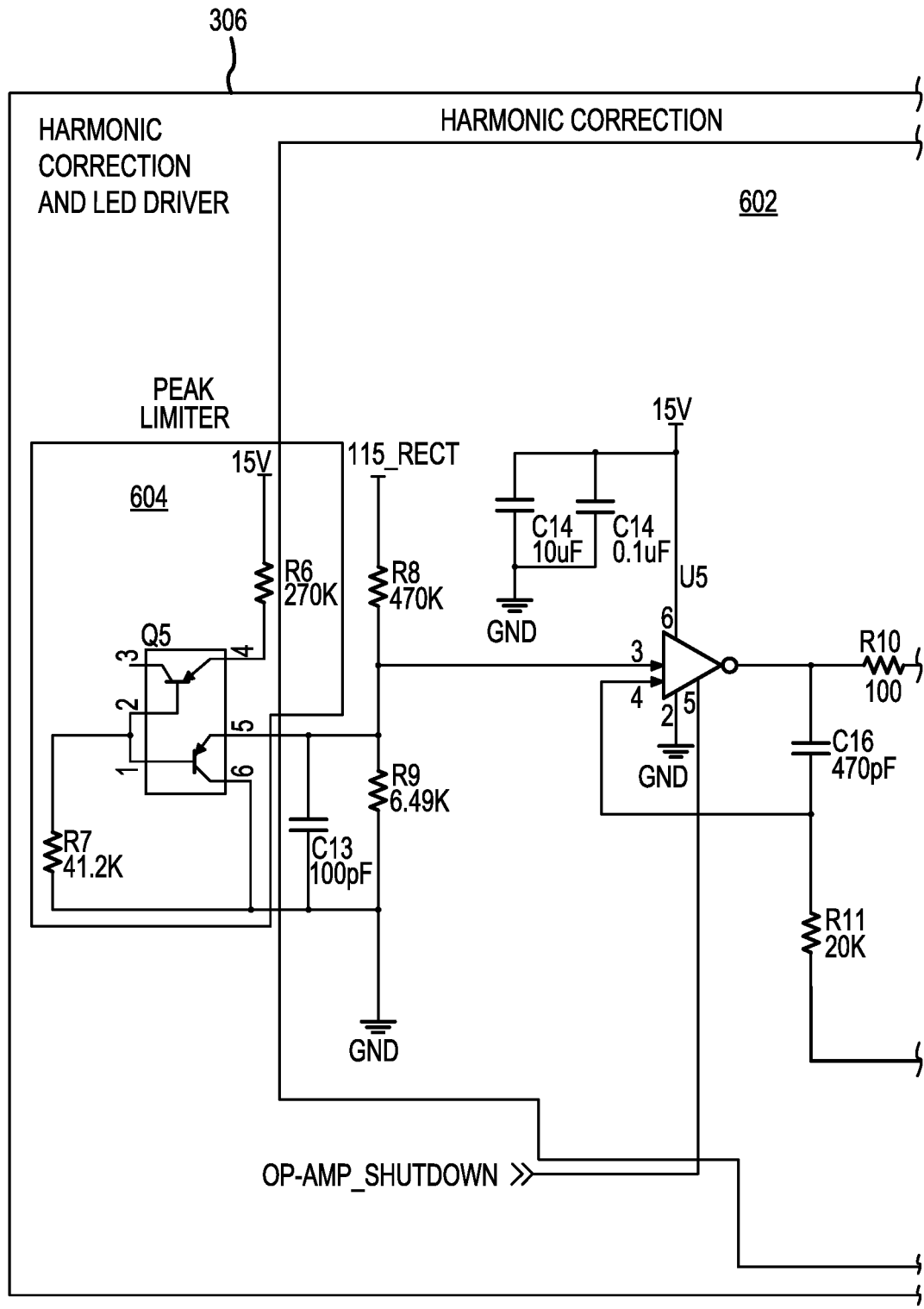
FIG. 6A illustrates a network of a harmonic correction and LED driver circuit, in accordance with various embodiments.
Figure 6A:
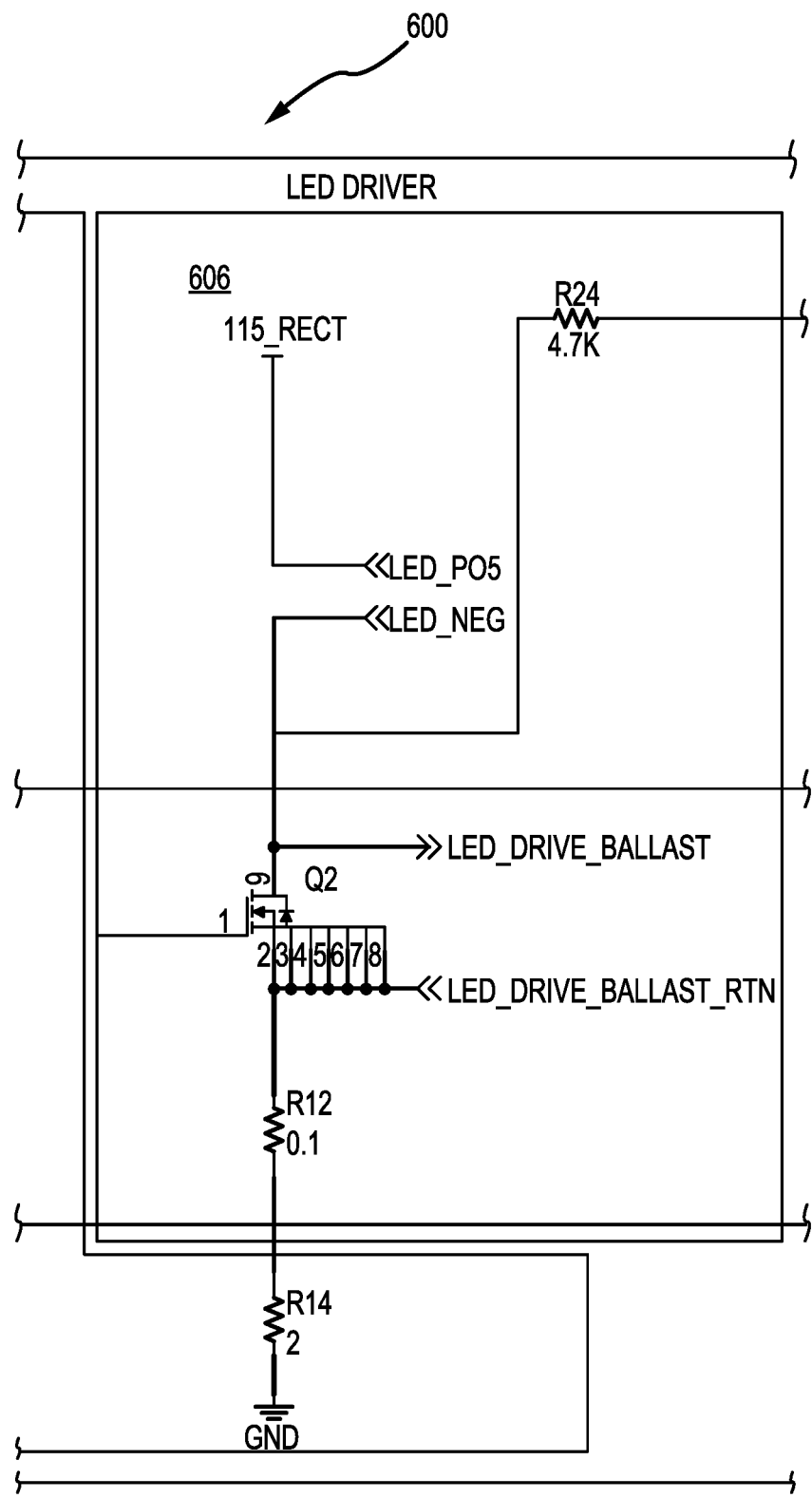
Figure 6A:
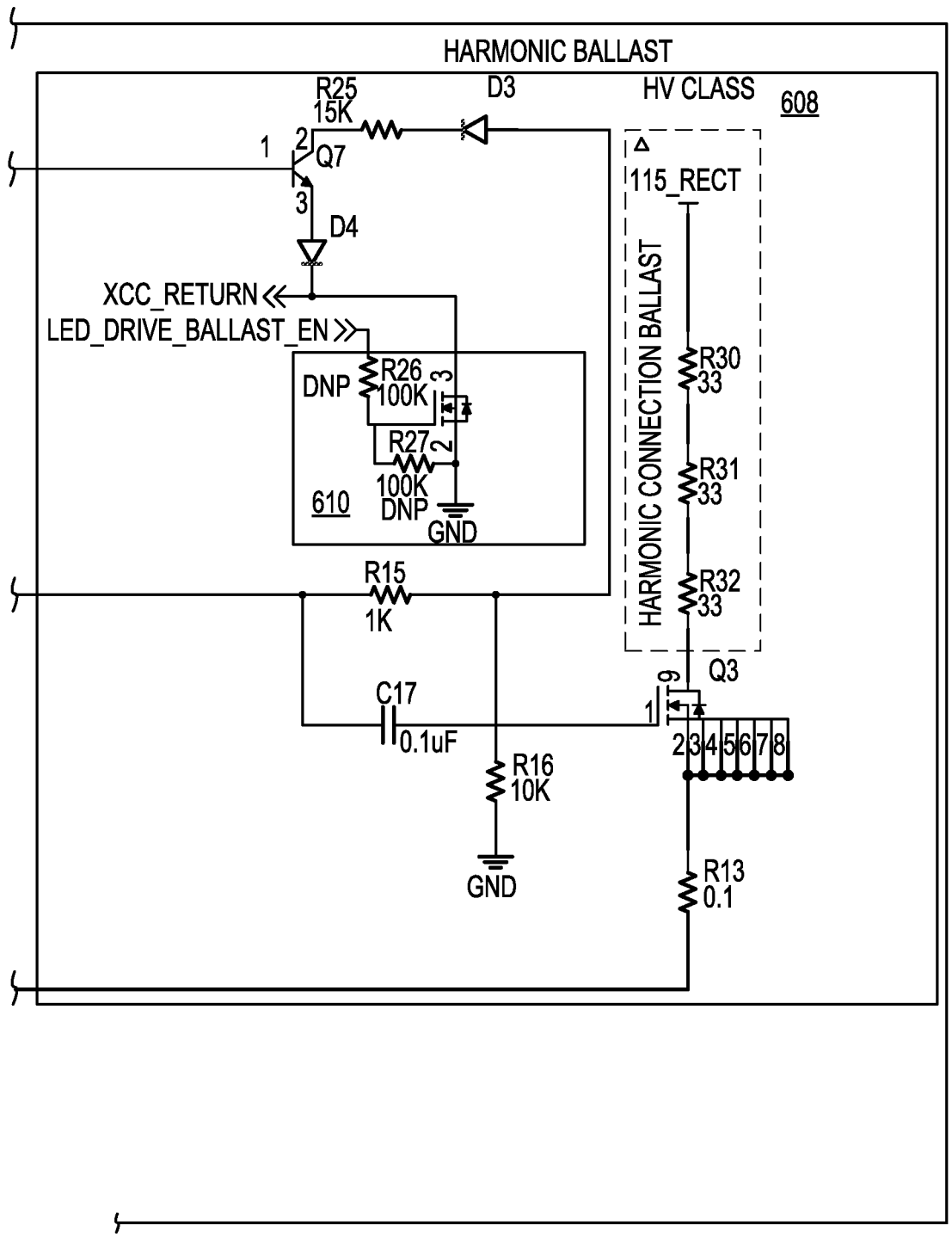

In various embodiments and with additional reference to FIG. 6A, a network 600 of HCLED driver circuit 304 is illustrated in accordance with various embodiments. Network 600 includes a harmonic correction circuit 602, a peak limiter circuit 604, an LED driver circuit 606, and a harmonic ballast circuit 608. In various embodiments, network 600 includes a cross-conduction prevention circuit 610 in electronic communication with the harmonic ballast circuit 608.

Figure 6B:
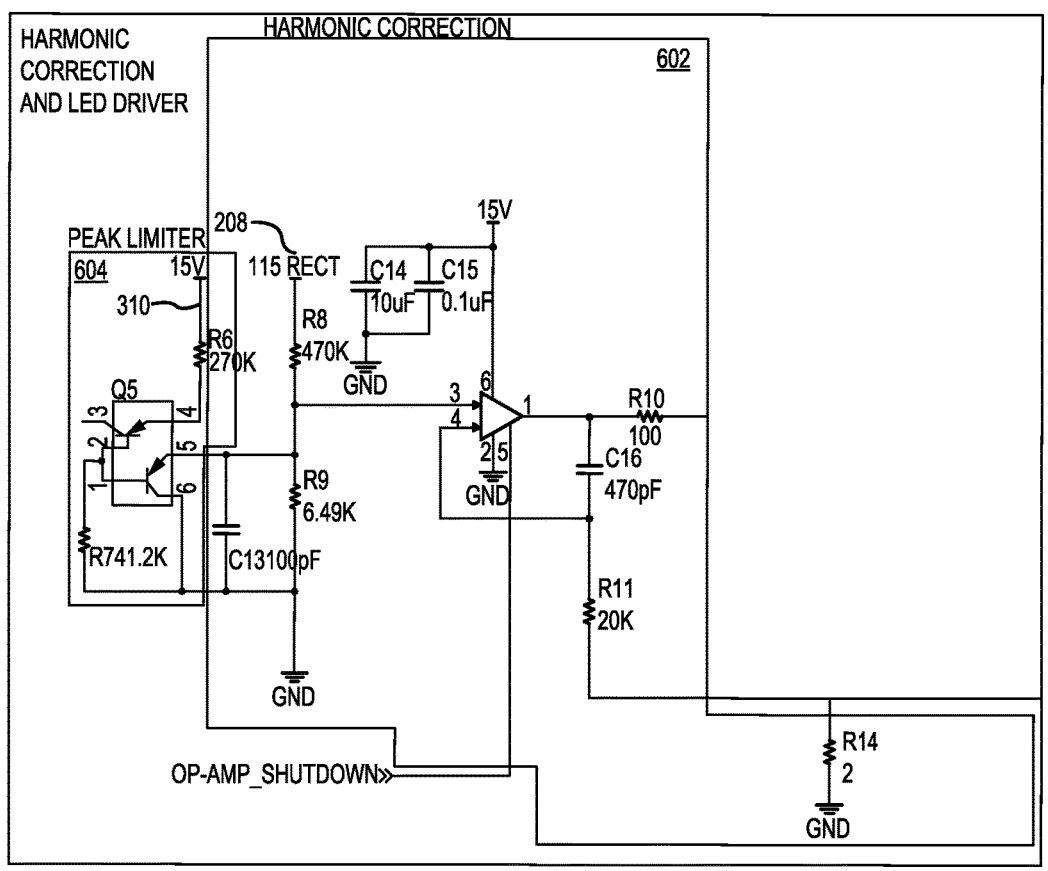
FIG. 6B illustrates a network of a harmonic correction and LED driver circuit, in accordance with various embodiments.

With additional reference to FIG. 6B, harmonic correction circuit 602 and peak limiter circuit 604 are illustrated in schematic detail according to various embodiments. The harmonic correction circuit 602 comprises an op-amp U5 having the non-inverting input connected to the rectified input voltage. The rectified input voltage is scaled down through a resistor divider composed of R8 and R9 to generate a current reference waveform. The inverting input of U5 is connected to a current sense resistor R14 through which the LED and harmonic ballast current flows. The output of U5 is applied to the gate of an LED driver transistor (Q2, shown in FIG. 6C) and the gate of a harmonic ballast transistor (Q3, shown in FIG. 6C). When the op-amp U5 is enabled, it acts to make the feedback voltage from the current sense resistor R14 equal to the current reference waveform. In this regard, the harmonic correction circuit 602 makes the current reference waveform proportional to the voltage waveform and thereby causes the flash lamp unit to appear as a simple resistive element to the primary power system 22.

The peak limiter circuit 604 comprises a pair of PNP transistors Q5 as well as the resistors R6 and R7. The peak limiter circuit 604 clips the peak of the reference waveform if the input voltage exceeds a maximum normal operating range. In this regard, the peak limiter circuit 604 limits the maximum current of the LEDs and thereby inhibits overdriving the LEDs during a high voltage transient. In various embodiments, the LEDs may continue to operate during the high voltage transient, but the harmonic performance of the unit may be degraded. When the voltage returns within the maximum normal operating range the peak limiter circuit 604 discontinues operation. In various embodiments the normal operating range may be between 104 Vrms and 122 Vrms, or may be between 110 Vrms and 120 Vrms, or may be between 112 Vrms and 115 Vrms.

Figure 6C:
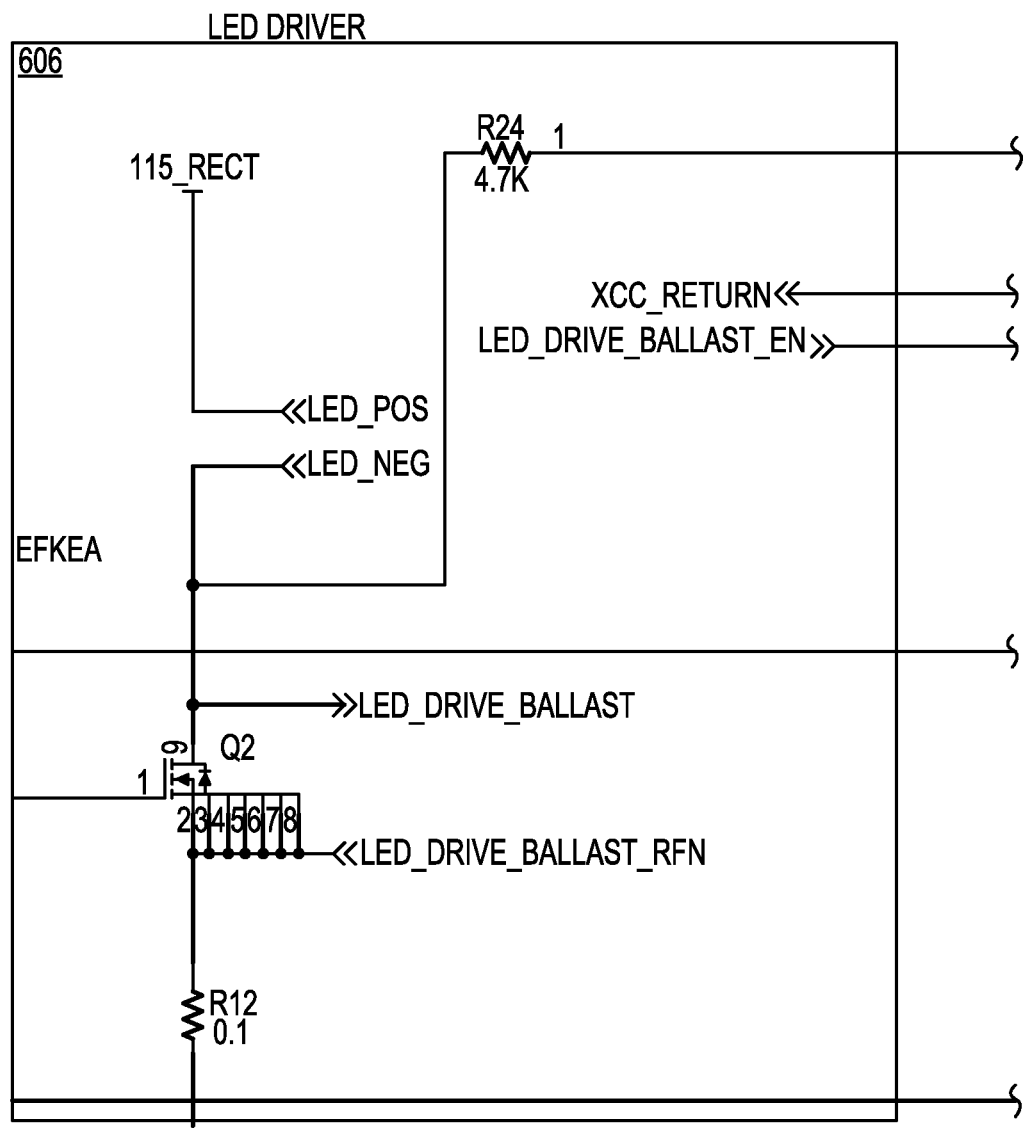
FIG. 6C illustrates a network of a harmonic correction and LED driver circuit, in accordance with various embodiments.
Figure 6C:
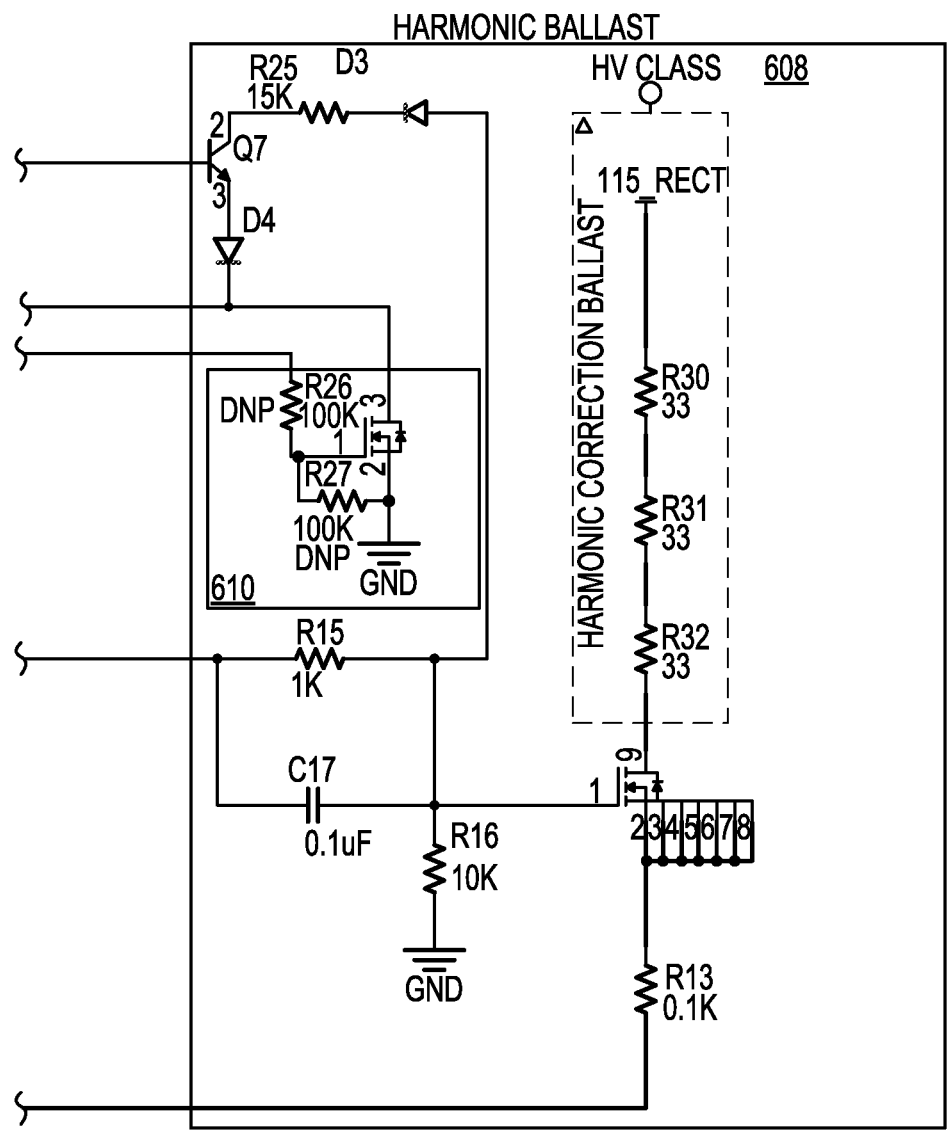

With additional reference to FIG. 6C, LED driver circuit 606, harmonic ballast circuit 608, and cross-conduction prevention circuit 610 are illustrated in schematic detail according to various embodiments. Harmonic ballast circuit 608 includes a harmonic balance transistor Q3 having its gate connected to the op-amp U5 through a resistor divider. When the voltage is below a forward voltage of the LED string in electronic communication with the HCLED driver circuit 304, current will not flow through the LED driver transistor Q2. In response the op-amp U5 will increase its output voltage until sufficient current flows through the harmonic ballast transistor Q3 to keep the sense resistor current proportional to the current reference waveform. In an ideal embodiment, the majority of the voltage will develop across the resistors connected to the drain of the harmonic ballast transistor Q3 tending thereby to limit the power Q3 dissipates.

The LED driver circuit 606 includes the LED driver transistor Q2. The gate of Q2 is connected directly to the output of the op-amp U5 such that the LED driver transistor Q2 is fully on when current is flowing through the harmonic ballast transistor Q3. In response to the voltage of the input waveform exceeding the forward voltage of the LED string, current begins flowing through the LED driver transistor Q2. In response to the current flowing through the LED driver transistor Q2, the op-amp U5 output voltage begins to decrease tending thereby to bring the LED driver transistor Q2 into regulation. In this regard, once the input voltage drops below an LED string voltage, current stops flowing through the LED driver transistor Q2. In response to stopping the current flow through the LED driver transistor Q2, the op-amp U5 tends to bring the harmonic ballast transistor Q3 into regulation. In various embodiments a cross-conduction preventions circuit may be used which pulls down the gate voltage of the harmonic ballast transistor Q3 when current is sensed in the LED string.

Figure 7:
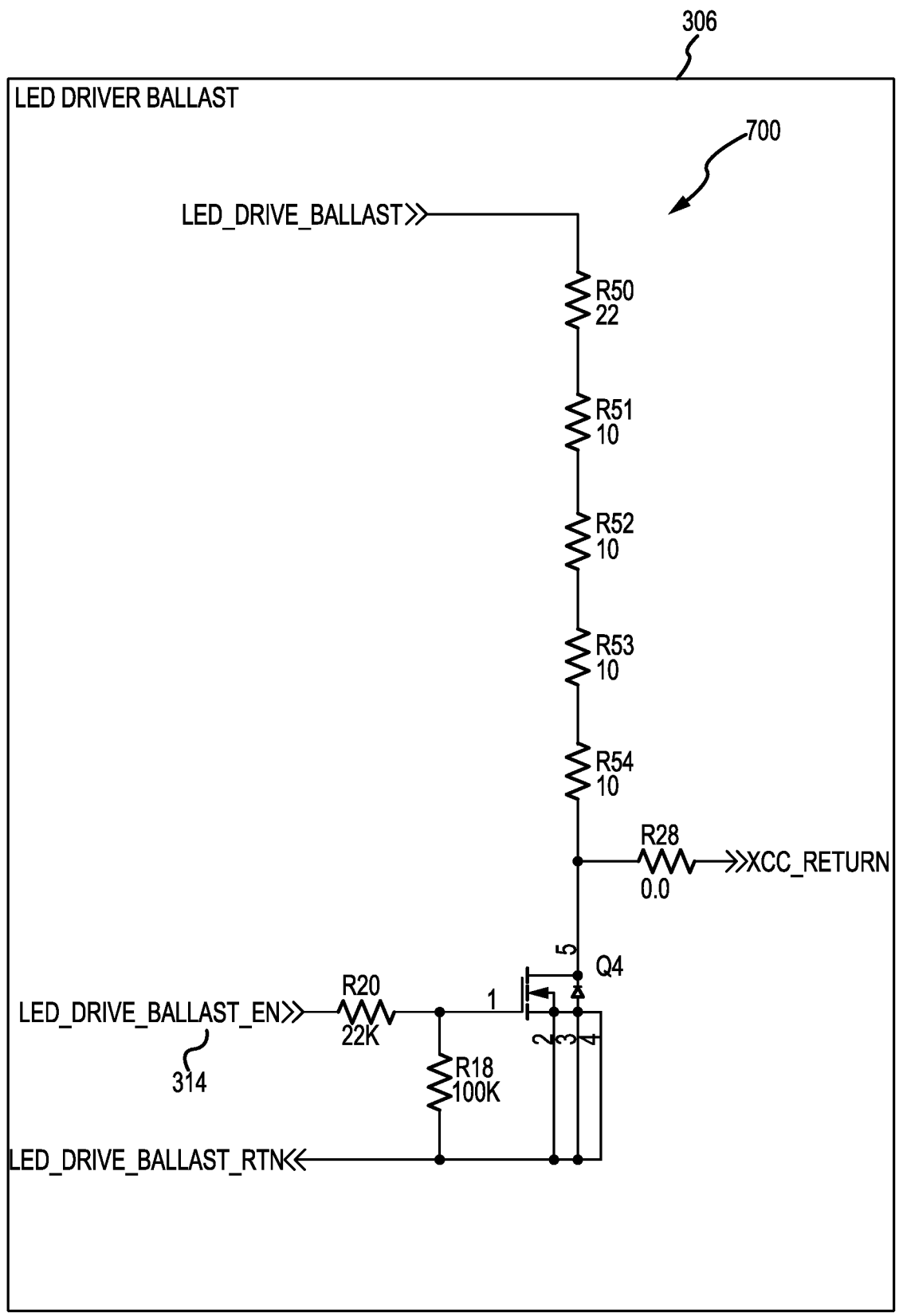
FIG. 7 illustrates a network of a LED driver ballast circuit, in accordance with various embodiments

In various embodiments and with additional reference to FIG. 7, network 700 of LED driver ballast circuit 306 is illustrated in schematic detail. Network 700 is connected in parallel with the LED driver transistor Q2. In this regard, network 700 tends to allow some of the power which would otherwise be dissipated at Q2 to be moved away from the LED driver transistor Q2. Network 700 includes an LED driver ballast transistor Q4 which is enabled by the ballast enable signal 314 (LED_DRIVE_BALLAST_EN). In this regard, the ballast only conducts when the LED string is conducting. In response to current flowing through the LED driver ballast circuit 306, the voltage developed across the resistors R50 through R54 may be used to turn on a transistor Q7 (shown in FIG. 6C). In this regard, the collector of the transistor Q7 tends to act as a weak pull-down thereby tending to assist driving the gate of harmonic ballast transistor Q3 further into the off-state while the LED string is conducting.

Figure 8:
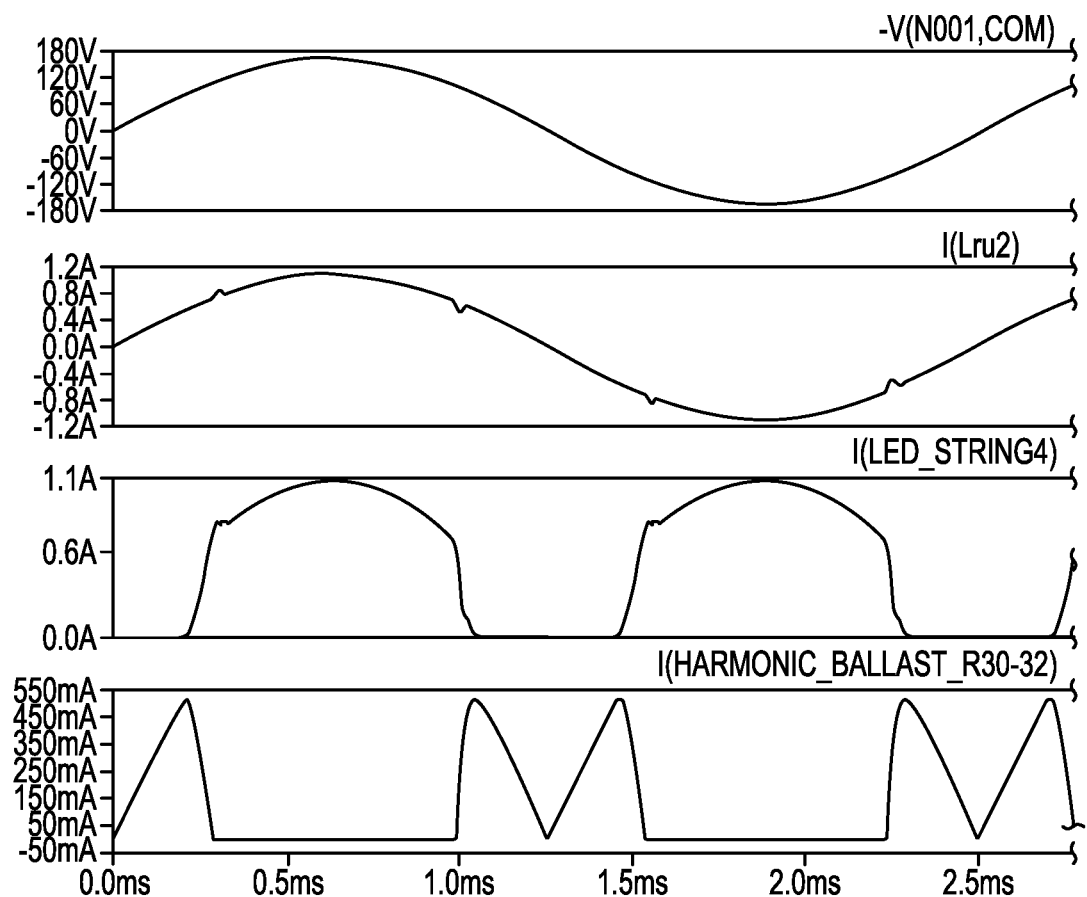
FIG. 8 illustrates wave forms of the circuit simulation results for an anti-collision light having a driver board regulation circuit.
Figure 8:
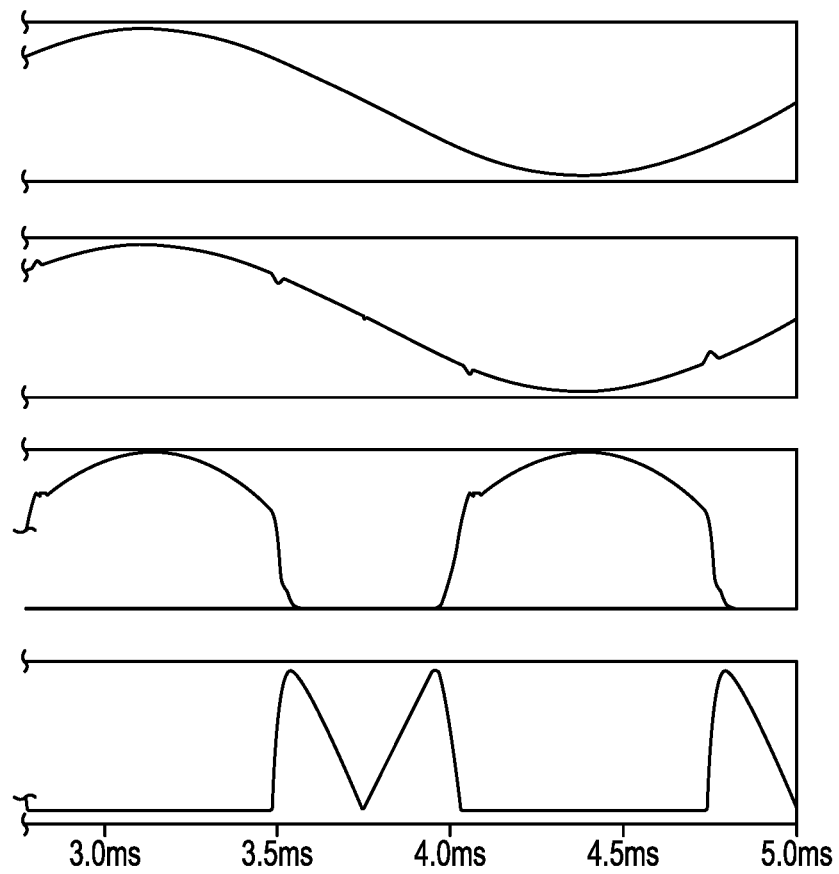

In various embodiments and with additional reference to FIG. 8, wave forms of the circuit simulation results for an anti-collision light having driver board regulation circuit 206 are illustrated. The driver board regulation circuit 206 tends to minimize the harmonic current draw by the anti-collision light. The driver board regulation circuit 206 and HCLED driver circuit 304 are configured such that the majority of the current drawn by the anti-collision light will be proportional to the voltage supplied from the shipside power (e.g., primary power system 22). In this regard, the HCLED driver circuit 304 tends to cause the anti-collision light to appear as a simple resistor to the shipside power. The plot labeled '-V(N001, COM)' illustrates the AC voltage waveform with respect to time from 0 ms to 5 ms. The plot labeled 'I(Lru2)' illustrates the current waveform through the anti-collision light with respect to time from 0 ms to 5 ms. The plot labeled 'I(Led_string4)' illustrates the LED string current flow with respect to time from 0 ms to 5 ms. The plot labeled 'I(Harmonic_ballast_r30-32) illustrates the current flow through the harmonic ballast from 0 ms to 5 ms. It is clear from the plots that the resistance of the LED string causes the current transition of the LED string to be highly sloped when cycling form on to off. This way may be described as a square wave with the plateaus being described by a cycloid function. This particularity tends to induce an artifact in the I(Lru2) waveform occurring approximately at the transition point of the LED string. The current flow through the harmonic ballast describes a reflected double sawtooth wave occurring between the off period of the LED string.

Figure 9:
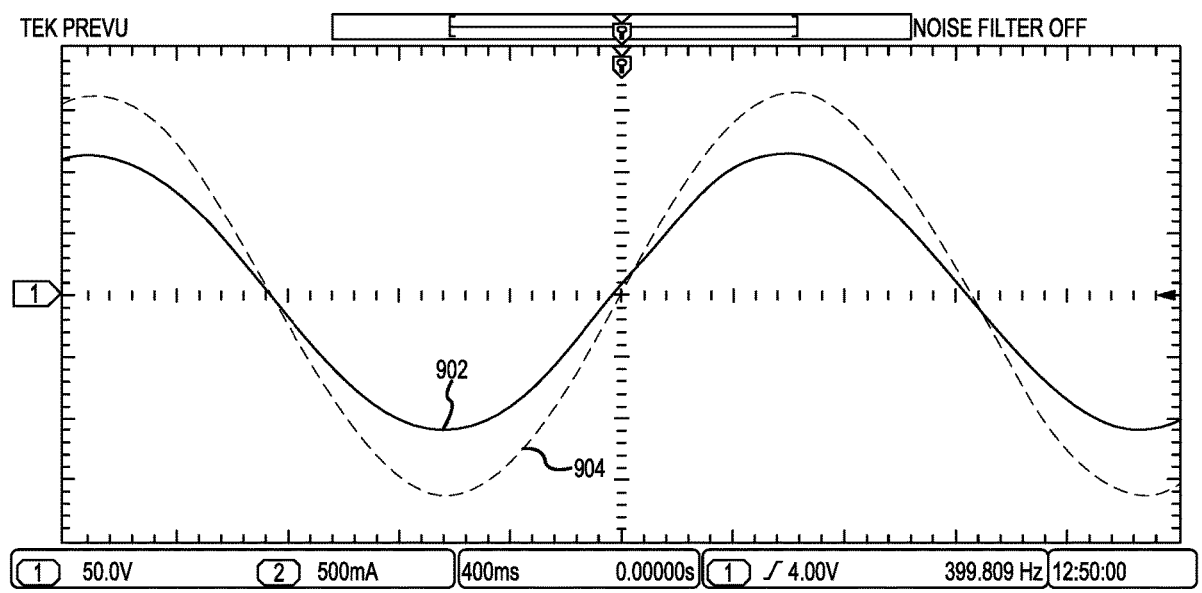
FIG. 9 illustrates voltage and current wave forms for an anti-collision light having a driver board regulation circuit, in accordance with various embodiments.

With additional reference to FIG. 9, the voltage and current wave forms for an anti-collision light having a driver board regulation circuit are illustrated according to various embodiments. It is evident that the current 902 and the voltage 904 wave forms are harmonically balanced by the HCLED driver circuit 304 of driver board regulation circuit 206. In various embodiments, the relative phase shift of the peaks may be zero. In various embodiments, the relative phase shift between the peaks may be between 5% and 10% of the overall harmonic distortion.

Figure 10:
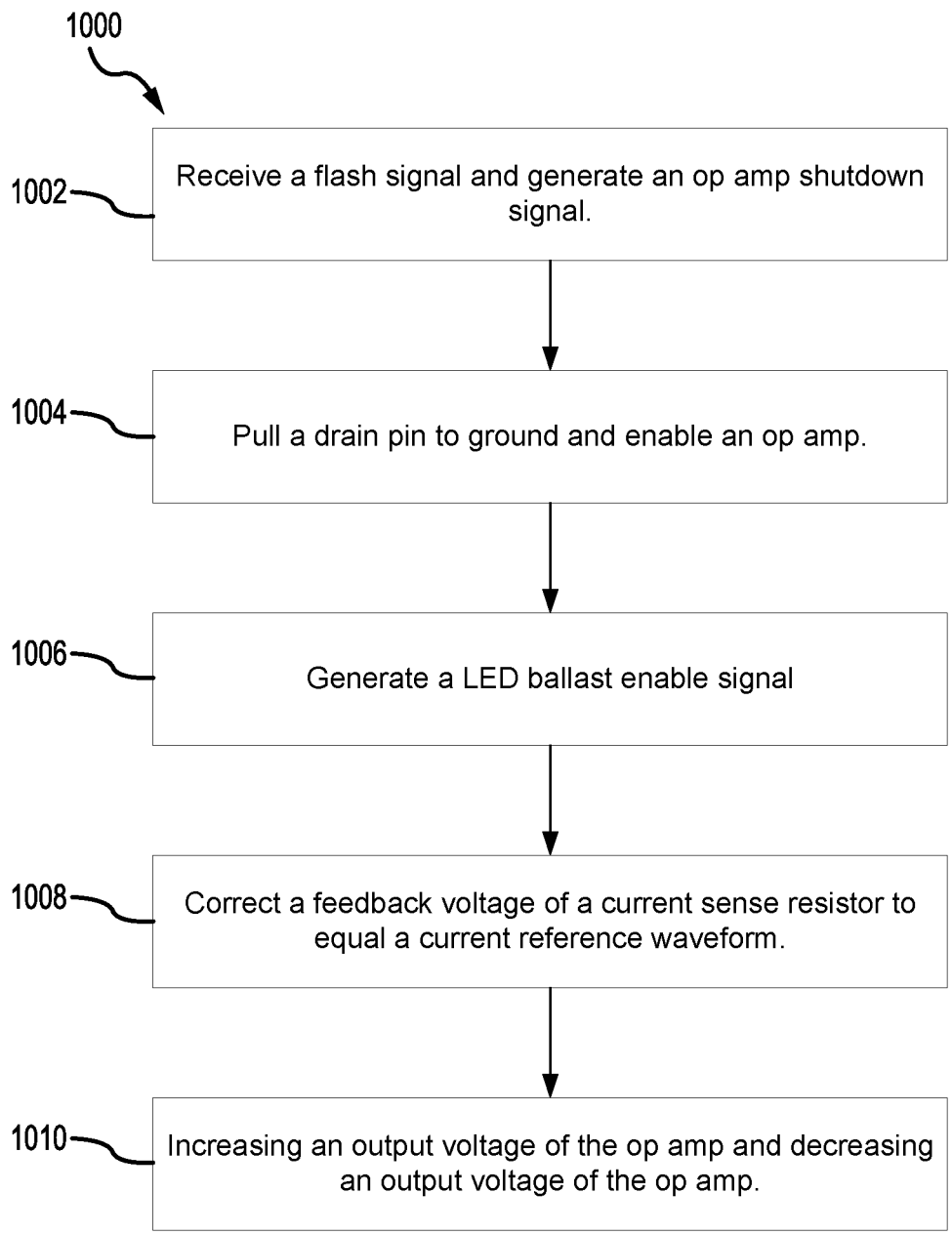
FIG. 10 illustrates method of reducing power harmonics in a LED flash lamp unit, in accordance with various embodiments.

In various embodiments and with additional reference to FIG. 10, a method 1000 of reducing power harmonics in a light emitting diode (LED) flash lamp unit comprises receiving a flash signal and generating an op amp shutdown signal (step 1002). Driver board circuit 206 may receive the flash signal 210 and generate the op amp shutdown signal 312. Method 1000 includes pulling a drain pin of a FET to ground and, in response, enabling an op-amp (step 1004). For example, the Q6 NFET drain pin may be pulled to ground and thereby enable the harmonic correction op-amp U5. Method 1000 includes generating an LED ballast enable signal in response to the flash signal (step 1006). Driver board circuit 206 may generate the LED ballast enable signal 314. Method 1000 includes correcting a feedback voltage of a current sense resistor to equal a current reference waveform in response to enabling the op-amp, wherein the current reference waveform is proportional to a voltage waveform (step 1008). In various embodiments, method 100 includes increasing an output voltage of the op-amp while the output voltage is below a forward voltage of an LED string and decreasing an output voltage of the op-amp in response to current flowing through an LED driver transistor (step 1010).

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A harmonically corrected driver board architecture of electronically communicating circuits comprising:
a driver board regulation circuit comprising
a harmonic correction and light emitting diode (HCLED) driver circuit;
a LED driver ballast circuit; and
a flash interface circuit, wherein the flash interface circuit is configured to generate an op-amp shutdown signal to the HCLED driver circuit.

2. The harmonically corrected driver board architecture of electronically communicating circuits of claim 1, wherein the driver board regulation circuit is configured to generate a regulated 15V DC power in response to receiving a 115V AC power.

3. The harmonically corrected driver board architecture of electronically communicating circuits of claim 1, wherein the flash interface circuit generates the op-amp shutdown signal and a LED ballast enable signal in response to receiving a flash signal.

4. The harmonically corrected driver board architecture of electronically communicating circuits of claim 1, wherein the HCLED driver circuit further comprises a network including a harmonic correction circuit, an LED driver circuit, a harmonic ballast circuit, a peak limiter circuit, and a cross-conduction prevention circuit.

5. The harmonically corrected driver board architecture of electronically communicating circuits of claim 4, wherein the harmonic correction circuit comprises an op-amp having a non-inverting input connect to a rectified input voltage and the inverting input connected to a current sense resistor, wherein the rectified input voltage is scaled down through a first resistor divider to generate a current reference waveform.

6. The harmonically corrected driver board architecture of electronically communicating circuits of claim 5, wherein the op-amp, while active, is configured to make a feedback voltage from the current sense resistor equal to the current reference waveform.

7. The harmonically corrected driver board architecture of electronically communicating circuits of claim 4, wherein the peak limiter circuit is configured to clip the peak of a voltage reference waveform in response to the voltage reference waveform exceeding a maximum normal operating range.

8. The harmonically corrected driver board architecture of electronically communicating circuits of claim 5, wherein the harmonic ballast circuit includes a harmonic ballast transistor having its gate connected to the op-amp through a second resistor divider, wherein the op-amp and the harmonic ballast transistor are configured to keep the sense resistor current proportional to the current reference waveform.

9. The harmonically corrected driver board architecture of electronically communicating circuits of claim 8, wherein the LED driver circuit includes an LED driver transistor having a gate connected to the output of the op-amp such that the LED driver transistor is fully on when current is flowing through the harmonic ballast transistor.

10. An aircraft anti-collision lighting architecture of electronically communicating components comprising:
a controller board in electrical communication with an LED board and a driver board;
wherein the controller board is configured to protect, filter, and rectify a primary power to generate a driver board power,
wherein the controller board generates a flash signal,
wherein the driver board comprises:
a driver board regulation circuit;
a harmonic correction and light emitting diode (HCLED) driver circuit;
a LED driver ballast circuit; and
a flash interface circuit, wherein the flash interface circuit is configured to generate an op-amp shutdown signal to the HCLED driver circuit in response to receiving the flash signal.

11. The aircraft anti-collision lighting architecture of electronically communicating components of claim 10, wherein the driver board regulation circuit is configured to generate a regulated 15V DC power in response to receiving the driver board power.

12. The aircraft anti-collision lighting architecture of electronically communicating components of claim 10, wherein the flash interface circuit generates a LED ballast enable signal in response to receiving the flash signal.

13. The aircraft anti-collision lighting architecture of electronically communicating components of claim 10, wherein the HCLED driver circuit further comprises a network including a harmonic correction circuit, an LED driver circuit, a harmonic ballast circuit, a peak limiter circuit, and a cross-conduction prevention circuit.

14. The aircraft anti-collision lighting architecture of electronically communicating components of claim 13, wherein the harmonic correction circuit comprises an op-amp having a non-inverting input connect to a rectified input voltage and the inverting input connected to a current sense resistor, wherein the rectified input voltage is scaled down through a first resistor divider to generate a current reference waveform.

15. The aircraft anti-collision lighting architecture of electronically communicating components of claim 14, wherein the op-amp, while active, is configured to make a feedback voltage from the current sense resistor equal to the current reference waveform.

16. The aircraft anti-collision lighting architecture of electronically communicating components of claim 13, wherein the peak limiter circuit is configured to clip the peak of a voltage reference waveform in response to the voltage reference waveform exceeding a maximum normal operating range.

17. The aircraft anti-collision lighting architecture of electronically communicating components of claim 14, wherein the harmonic ballast circuit includes a harmonic ballast transistor having its gate connected to the op-amp through a second resistor divider, wherein the op-amp and the harmonic ballast transistor are configured to keep the sense resistor current proportional to the current reference waveform.

18. The aircraft anti-collision lighting architecture of electronically communicating components of claim 17, wherein the LED driver circuit includes an LED driver transistor having a gate connected to the output of the op-amp such that the LED driver transistor is fully on when current is flowing through the harmonic ballast transistor.

19. A method of reducing power harmonics in a light emitting diode (LED) flash lamp unit comprising:
receiving, by a driver board circuit, a flash signal;
generating, by the driver board circuit, an op amp shutdown signal in response to the flash signal;
pulling, by the driver board circuit, a drain pin of a field effect transistor to ground and, in response, enabling an op-amp;

generating, by the driver board circuit, a LED ballast enable signal in response to the flash signal; and correcting, by the driver board circuit, a feedback voltage of a current sense resistor to equal a current reference waveform in response to enabling the op-amp, wherein the current reference waveform is proportional to a voltage waveform.

20. The method of claim 19, further comprising:

increasing, by the driver board circuit, an output voltage of the op-amp while the output voltage is below a forward voltage of an LED string; and decreasing, by the driver board circuit, an output voltage of the op-amp in response to current flowing through an LED driver transistor.

* * * * *